(12) United States Patent
Meintker et al.

(10) Patent No.: US 6,656,338 B2
(45) Date of Patent: Dec. 2, 2003

(54) METHOD AND DEVICE FOR REDUCING CATIONIC IMPURITIES AND FOR DOSING LITHIUM IN THE COOLING WATER OF A LIGHT WATER REACTOR, AND A COOLING-WATER SYSTEM OF A LIGHT WATER REACTOR HAVING SUCH A DEVICE

(75) Inventors: Manfred Meintker, Mörendorf (DE); Michael Bolz, Karlsdorf (DE); Günther Enkler, Waghäusl (DE); Wilfried Rühle, Eppelheim (DE)

(73) Assignees: Framatome ANP GmbH, Erlangen (DE); ENBW Kraftwerke AG, Stuttgart (DE)

( * ) Notice: Subject to any disclaimer, the term of this patent is extended or adjusted under 35 U.S.C. 154(b) by 0 days.

(21) Appl. No.: 10/133,366

(22) Filed: Apr. 26, 2002

(65) Prior Publication Data

US 2003/0000849 A1 Jan. 2, 2003

Related U.S. Application Data

(63) Continuation of application No. PCT/DE00/03763, filed on Oct. 24, 2000.

(30) Foreign Application Priority Data

Oct. 26, 1999 (DE) .......................... 199 51 642

(51) Int. Cl.$^7$ .............................................. B01D 59/42
(52) U.S. Cl. ...................................................... 204/536
(58) Field of Search ................................ 204/536, 542, 204/632, 647

(56) References Cited

U.S. PATENT DOCUMENTS

| 3,715,287 A | * | 2/1973 | Johnson |
| 4,148,708 A | | 4/1979 | Grant |
| 6,221,225 B1 | * | 4/2001 | Mani ......................... 204/523 |

FOREIGN PATENT DOCUMENTS

| DE | 197 47 077 A1 | 4/1999 |
| DE | 197 47 076 A1 | 6/1999 |

\* cited by examiner

*Primary Examiner*—Arun S. Phasge
(74) *Attorney, Agent, or Firm*—Laurence A. Greenberg; Werner H. Stemer; Gregory L. Mayback

(57) ABSTRACT

For dosing lithium in cooling water containing cationic impurities or for reducing cationic impurities, the invention guides cooling water cycle through a first side of an electrodialysis unit and guides a concentration cycle through a second side of the electrodialysis unit. Cationic impurities are filtered out of the medium of the concentration cycle with a selective ion exchanger that is disposed in the concentration cycle.

50 Claims, 4 Drawing Sheets

METHOD AND DEVICE FOR REDUCING CATIONIC IMPURITIES AND FOR DOSING LITHIUM IN THE COOLING WATER OF A LIGHT WATER REACTOR, AND A COOLING-WATER SYSTEM OF A LIGHT WATER REACTOR HAVING SUCH A DEVICE

CROSS-REFERENCE TO RELATED APPLICATION

This application is a continuation of copending International Application PCT/DE00/03763, filed Oct. 24, 2000 which designated the United States and which was not published in English.

BACKGROUND OF THE INVENTION

Field of the Invention

The invention relates to a method for reducing cationic impurities in the cooling-water loop of a light water reactor, and to the application of the method, the cooling-water loop containing a cationic solution. Furthermore, the invention relates to a method and the application of the method for dosing lithium in a cooling-water loop, containing cationic impurities, of a light water reactor. The invention also relates to a device having an electrodialysis unit that is connected on one side to a water loop, and connected on the other side to a concentrate loop. Finally, the invention relates to a cooling-water system of a light water reactor. In nuclear power plants having a light water reactor, boron in the form of boric acid ($H_3BO_3$) is added to the reactor coolant (water) for the purpose of absorbing neutrons. It serves to protect the reactor components against radiation and is practiced both in the case of boiling water reactors and, in particular, also in the case of pressurized water reactors. The boric acid has a side effect in that it lowers the pH of the cooling water, an effect that is not desired for reasons of protecting the components against corrosion, and it must be at least partially compensated for by adding an alkalizing agent. Isotopically pure lithium-7 ($^7Li$) is normally used as alkalizing agent because it, on one hand, has virtually no undesired nuclear reactions with the neutrons present in the reactor core and, on the other hand, is continuously formed itself in the reactor by the nuclear reaction $^{10}B(n,\alpha)^7Li$ proceeding during the neutron absorption by the active boron isotope $^{10}B$.

The isotopic purity of the lithium used is necessary because the other isotope, $^6Li$, present in the natural composition of the lithium has a very strong reaction with the neutrons, which produces tritium as reaction product. The excessive enrichment of tritium in the cooling water is undesired. The $^7Li$ is added in the form of lithium hydroxide solution (LiOH) and is present as a monovalent cation $^7Li^+$ as a consequence of the dissociation of LiOH. It is expensive to produce isotopically pure $^7Li$. Isotopically pure $^7Li$ is, therefore, very valuable and it is desirable to handle it economically.

The continuous reformation of $^7Li$ as a consequence of the nuclear reaction of the $^{10}B$, and the only slight losses due to cooling water leaks cause an increase in the $^7Li$ concentration in the cooling water in the course of a fuel cycle of a light water reactor. This relates, in particular, to cooling water in the primary loop of a light water reactor, in particular, cooling water in the primary loop of a pressurized water reactor. The $^7Li$ concentration in the cooling water increases, in particular, at the start, that is to say, in an early time domain of a fuel cycle. Because, upon overshooting a concentration of approximately 2 ppm, lithium can cause corrosion on reactor components, it is necessary to withdraw a sufficient quantity of $^7Li^+$ again from the cooling water. The result is chiefly to reduce corrosion of fuel rod cladding tubes that enclose the nuclear fuel in the fuel rod.

Because, however, the density of fissile material in the fuel also reduces in the course of a fuel cycle, it is also necessary to reduce the concentration of neutron-absorbing boron in the cooling water in the course of a fuel cycle. The reduction is usually achieved by extracting the boron-containing cooling water from the cooling-water loop and the feeding in of an equally large quantity of boron-free water. In such a process, lithium is also removed from the loop with the boron-containing cooling water, and is not supplemented by the feeding in of the normally completely demineralized water. As a result, therefore, the reduction in boron concentration also lowers the lithium concentration. At the end of a fuel cycle, the cooling-water exchange masses are substantially enlarged, in order to achieve an adequate lowering of the boron concentration. Normally, LiOH solution is then fed into the cooling-water loop to maintain a required lithium concentration, in particular, into the primary loop of a pressurized water reactor.

It is, therefore, necessary, depending on the operating cycle of a light water reactor, to dose the content of lithium in the cooling water of the light water reactor. The dosing feeds lithium to the cooling water, in particular, chiefly at early times in the fuel cycle, and withdraws it from the cooling water, in particular, at later times in a fuel cycle.

Because radioactive materials are continuously produced by the nuclear fission in the reactor and by the activation of material as a consequence of the neutron emission, it is unavoidable that the materials pass partly into the cooling water and contaminate the cooling water. These materials can be present in the cooling water in a different chemical form and be partially undissolved and partially dissolved as anions or cations. This relates, in particular, to emitting nuclides, chiefly cesium and cobalt, which are present as cations. Because the separation of lithium from the cooling water is normally performed by employing the positive electric charge of the lithium cation, a portion of the cationic, radioactive impurities is also separated from the cooling water together with the lithium. The valuable, isotopically pure, separated lithium is, thereby, contaminated and can, therefore, not be reused, as a rule.

For example, to lower the lithium concentration, the cooling water is normally led through ion exchangers that include cation exchanger resins. These cation exchanger resins bind the lithium ions contained in the water flowing through virtually completely to the resin and simultaneously output an equivalent quantity of hydrogen ions to the water. However, they also bind the cationic impurities, and, therefore, concentrate emitting nuclides. If they are saturated and finally ineffective for the lithium withdrawal, they are replaced by new resins. A regeneration of the exchanger resins, in the case of which the very expensive $^7Li$ could be recovered and, if required, fed into the cooling-water loop again, has already foundered on the fact that, in such a case, the concentrated impurities are also released together with the $^7Li$. The depleted exchanger resins are, therefore, to be disposed of as highly emissive special waste.

The invention proceeds from the fact that the ion concentrations in two solutions can be set if an electrodialysis is performed between the loops of the two solutions. In this case, electrodialysis means ion transport through a membrane configuration having at least one membrane separating the loops, it being possible to control the direction and throughput of the ion transport by applying an electric voltage. Examples of such electrodialysis methods are described, for example, in German patent applications 19747077.7 and 19747076.9. However, the method described in German patent application 19747077.7, in particular, has the disadvantage that there is a lowering of the boron concentration at the same time as a lowering of the lithium concentration.

SUMMARY OF THE INVENTION

It is accordingly an object of the invention to provide a method and device for reducing cationic impurities and for dosing lithium in the cooling water of a light water reactor, and a cooling-water system of a light water reactor having such a device that overcomes the hereinafore-mentioned disadvantages of the heretofore-known devices and methods of this general type and that improves methods and devices that operate using such electrodialysis.

With the foregoing and other objects in view, there is provided, in accordance with the invention, a method for reducing cationic impurities in a cooling water including the steps of providing a light water reactor having a cooling-water loop containing a cationic solution, a concentrate loop containing a medium in which a heightened cation concentration is produced, and a selective ion exchanger disposed in the concentrate loop, guiding cooling water of the cooling-water loop through a first side of an electrodialysis unit, guiding the medium of the concentrate loop through a second side of the electrodialysis unit, and filtering out cationic impurities from the medium in the selective ion exchanger.

With the objects of the invention in view, there is also provided a method for dosing lithium in cooling water including the steps of providing a light water reactor having a cooling-water loop containing a cooling water with cationic impurities, a concentrate loop containing a medium having a heightened cation concentration, and a selective ion exchanger disposed in the concentrate loop, guiding the cooling water of the cooling-water loop through a first side of an electrodialysis unit, guiding the medium of the concentrate loop through a second side of the electrodialysis unit, applying an electric voltage in the electrodialysis unit to control an exchange of lithium cations between the cooling water in the cooling-water loop and the medium in the concentrate loop, and filtering out cationic impurities from the medium in the selective ion exchanger.

The invention proceeds from the prior art methods in a method for dosing lithium in a cooling water, containing cationic impurities, in a cooling-water loop of a light water reactor. In such a case, the cooling water is guided through a first side of an electrodialysis unit, and a medium is guided in a concentrate loop through the second side of the electrodialysis unit. A heightened cation concentration is present in the medium. The application of an electric voltage to the electrodialysis unit controls the exchange of lithium cations between the cooling water in the cooling-water loop and the medium in the concentrate loop.

According to the invention, the cationic impurities are filtered out by a selective ion exchanger. A cation exchanger, in particular, is suitable for such a purpose. The selective ion exchanger is disposed in the concentrate loop; the cleaning, therefore, takes place in a selective ion exchanger that is not flowed through by the cooling water but by the medium with the concentrated cations.

The invention proceeds from the surprising finding that the decontamination factor of a selective ion exchanger is a function of the concentration of the solution led through the ion exchanger. The decontamination factor specifies the ratio of the activity upstream of the ion exchanger to the activity downstream of the ion exchanger. It is substantially lower in a solution of low ion concentration than in the case of a higher concentration. Moreover, it can depend on the pH value and conductivity of the solution. Consequently, a membrane configuration exchanging selectively for cations, or a selective ion exchanger, is only conditionally effective as a membrane of the electrodialysis unit with the aid of which, for example, the Li concentrations in two loops are set. However, substantially better use can be made of the selectivity of an ion exchanger if it is used only as a filter for the ions to be selected in the correct loop.

It is preferred to employ a cation exchanger used as a dialysis membrane when utilizing an electrodialysis unit for dosing lithium in a cooling water containing cationic impurities. Such a configuration need be replaced not at all, or only at lengthy intervals. Rather, it is only the ion exchanger disposed in the concentrate loop that becomes depleted, in which case a substantially larger quantity of cationic impurities is then exchanged against $H^+$ ions, as compared to a situation where the exchanger were disposed in the water loop with the lower concentration. Consequently, relatively low quantities are already sufficient in the selective ion exchanger to effectively lower the concentration of cationic impurities in the system (that is to say, in the water loop and in the concentration loop). Moreover, the ratio of the impurities to the cations that are required for the water loop is shifted strongly to the benefit of the impurities in the depleted exchanger. As a result, there are, therefore, only low losses of $^7Li$, for example, in the reactor and small quantities of ion exchanger requiring disposal.

In accordance with another mode of the invention, it is preferred that the medium in the concentrate loop is guided through a partial loop with an accumulator for concentrating the cations and through a further partial loop, likewise connected to the accumulator, with the selective ion exchanger for filtering out the cationic impurities.

In accordance with an added mode of the invention, the medium guided in the concentrate loop is stored and fed to the cooling water when required. Such a configuration has the advantage that there is no need at a later instant in the fuel cycle to add to the cooling water additional isotopically pure lithium that is to be brought in. As such, according to the method, the isotopically pure lithium withdrawn at an earlier instant can be used again later in the cooling-water loop because it is effectively freed from impurities.

In accordance with a further mode of the invention, the two sides of the electrodialysis unit (that is to say, the cooling-water loop and the concentrate loop) are preferably separated by a membrane configuration that is virtually permeable to cations but largely prevents the passage of anions (cation exchanger membrane). As a result, there is virtually no transport of boron anions between the cooling water and the medium during transport of lithium (cations). Specifically, it is advantageously the aim to virtually suppress the transport of anions, in particular, boron-containing anions, through the electrodialysis unit. As a is result, the Li-containing cooling water is dosed and/or cleaned without changing the boron concentration. Thus, boron and lithium can be dosed independently of one another in each case when required.

In accordance with an additional mode of the invention, the cooling water of the cooling-water loop is optionally guided through the first side of the electrodialysis unit and, correspondingly, the medium of the concentrate loop is guided through the second side of the electrodialysis unit. It is also optionally possible to guide the cooling water through the second side of the electrodialysis unit, and the medium through the first side. Accordingly, it is possible to reverse the polarity of the voltage at the electrodialysis unit during the method. The reversal has the advantage that the electrodes of the electrodialysis unit are cleaned of deposits upon exchanging the loops for water and medium and simultaneously reversing the polarity of electric voltage.

In accordance with yet another mode of the invention, it is advantageous, furthermore, to extract cooling water from the cooling-water loop and store the water. The accumulator is preferably vented such that, in particular, $H_2O_2$ gas mixtures are withdrawn. In particular, the concentrate loop and/or the cooling-water loop are/is vented such that here, as well, $H_2O_2$ gas mixtures, in particular, are withdrawn.

In accordance with yet a further mode of the invention, it is also advantageous that the cooling-water loop is guided through an $H_2O_2$ recombiner.

In accordance with yet an added mode of the invention, the method is executed such that cations are transported from the cooling-water loop into the concentrate loop through a cation exchanger membrane. Oxygen is produced in this case in the cooling-water loop on the anode side of the electrodialysis unit, that is to say, the first side of the electrodialysis unit. It is, therefore, advantageous that at least one portion of the cooling water is fed to a cooling water sectional line and admixed to at least this part of the cooling water $H_2$, and at least this portion of the cooling water is guided through an $H_2O_2$ recombiner. Such a process has the advantage that cooling water is freed of oxygen and corrosive damage to reactor components is thereby reduced.

In accordance with yet an additional mode of the invention, the method is executed such that cations are transferred from the concentrate loop into the cooling-water loop through a cation exchanger membrane. The cations are preferably lithium cations. That is to say, according to the development the method according to the invention is executed virtually to feed lithium back into the cooling-water loop. In particular, for such a purpose, the cooling water is fed to a bypass line that bypasses an $H_2O_2$ recombiner. The point is that, in the case of the development of the method just named, no additional oxygen is produced in the cooling-water loop on the first (anode) side of the electrodialysis unit by the electrodialysis process, and so the previously named $H_2O_2$ recombiner is now bypassed by the bypass line.

The above-named method can, in particular, be used not only to dose lithium, but chiefly applied also to reduce cationic impurities in the coolant.

In accordance with again another mode of the invention, the method reduces cationic impurities in a cooling-water loop, containing a cationic solution, of a light water reactor. In such a case, cooling water from the cooling-water loop is guided through a first side of an electrodialysis unit, and a medium of a concentrate loop is guided through a second side of the electrodialysis unit. In the case of the method according to the invention, a heightened cation concentration is produced in the medium, the cationic impurities being filtered out of the medium in a selective ion exchanger in the concentrate loop.

In accordance with again a further mode of the invention, the method is, however, also applied for dosing lithium in the coolant. In particular, it is advantageous also to execute the last-named method using one of the above-named developments.

With the objects of the invention in view, in a light water reactor having a cooling-water loop containing a cooling water with cationic impurities and a concentrate loop containing a medium having a heightened cation concentration, there is also provided a device for at least one of reducing cationic impurities and dosing lithium in the cooling water, the device including an electrodialysis unit having two sides, one of the sides connected to the cooling-water loop and another of the sides connected to the concentrate loop, and a selective ion exchanger disposed in the concentrate loop for at least one of reducing cationic impurities and dosing lithium in the cooling water.

The device according to the invention is suitable, in particular, for carrying out one of the above-named variants of methods, or developments of one of the variants. According to the prior art, such a device has an electrodialysis unit that is connected on a first side to a cooling-water loop, and on another, second side to a concentrate loop. According to the invention, a selective ion exchanger is connected in the concentrate loop in the case of the device. In particular, the sides of the electrodialysis unit are separated by a membrane configuration, exchanging only cations, having at least one cation exchanger membrane. The membrane configuration is advantageously virtually permeable to lithium cations. On the other hand, it is advantageous that the membrane configuration is virtually impermeable to boron anions.

In accordance with an added feature of the invention, the electrodialysis unit has a device controlling an exchange of lithium cations between the cooling water in the cooling-water loop and the medium in the concentrate loop by applying an electric voltage.

In accordance with an additional feature of the invention, the two sides are separated by a membrane configuration having at least one cation exchanger membrane exchanging substantially only cations.

The ion exchanger is selective, in particular, for cationic cesium and/or cobalt nuclides. The ion exchanger is advantageously configured for such a purpose as a cation exchanger. In particular, it contains phenol- and/or formaldehyde-based resins, specifically, those that are referred to under the commercial names of Duolite and/or Amberlite. These have the advantage that they are selective, in particular, for cationic cesium and/or cobalt nuclides.

In accordance with yet another feature of the invention, an $H_2O_2$ recombiner is connected to the water loop. The recombiner serves to recombine the oxygen produced, in particular, in the electrodialysis unit. The $H_2O_2$ recombiner advantageously includes, for such a purpose, a catalyst bed filled with an anion exchanger. The anion exchanger preferably includes a palladium-doped resin. Particularly suitable for such purposes is a palladium-doped resin that is available under the commercial name of Lewatit and is described, for example, in more detail in the company publications of Bayer AG.

In accordance with yet a further feature of the invention, the electrodialysis unit is connected to the water loop and the concentrate loop through a switching valve. The water loop can be connected optionally through the switching valve to the first or else second side of the electrodialysis unit. Accordingly, the connection of the concentrate loop can then be switched over to the electrodialysis unit. That is to say, either the water loop can be connected to the first side, and the concentrate loop can be connected to the second side of the electrodialysis unit, or, instead, the water loop can be connected to the second side, and the concentrate loop can be connected to the first side. The connections of the loops can, therefore, be switched over through the switching valve. The electric voltage present at the electrodialysis unit can be switched over according to a routing of the water loops. The configuration has the advantage that an electrode of the electrodialysis unit can optionally be used as cathode or else as anode, and so the direction of the electrodialysis process can be reversed. Consequently, an electrode of the electrodialysis unit can be freed from deposits that accumulate once a switching direction has been selected.

In accordance with yet an added feature of the invention, an accumulator having a sealable feed-in opening into the water loop is connected to the concentrate loop. The accumulator in the concentrate loop advantageously serves to store the lithium-hydroxide solution, and the feed-in opening is to be opened, when required, to feed back the lithium-hydroxide solution, such that isotopically pure $^7$Li is fed back into the water loop.

In accordance with yet an additional feature of the invention, the cooling-water system of a light water reactor includes a coolant cleanup plant, a coolant storage device, a coolant evaporator plant, and a device according to one of the developments of the invention. In such a case, the water loop of the device according to the invention is connected to the coolant cleanup plant or the coolant storage device or the coolant evaporator plant.

With the objects of the invention in view, there is also provided a light water reactor including a cooling-water loop containing a cooling water with cationic impurities, a concentrate loop containing a medium having a heightened cation concentration, an electrodialysis unit having two sides, one of the sides connected to the cooling-water loop and another of the sides connected to the concentrate loop, and a selective ion exchanger disposed in the concentrate loop for at least one of reducing cationic impurities and dosing lithium in the cooling water.

Other features that are considered as characteristic for the invention are set forth in the appended claims.

Although the invention is illustrated and described herein as embodied in a method and device for reducing cationic impurities and for dosing lithium in the cooling water of a light water reactor, and a cooling-water system of a light water reactor having such a device, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

DESCRIPTION OF THE PREFERRED EMBODIMENTS

Figure 1:
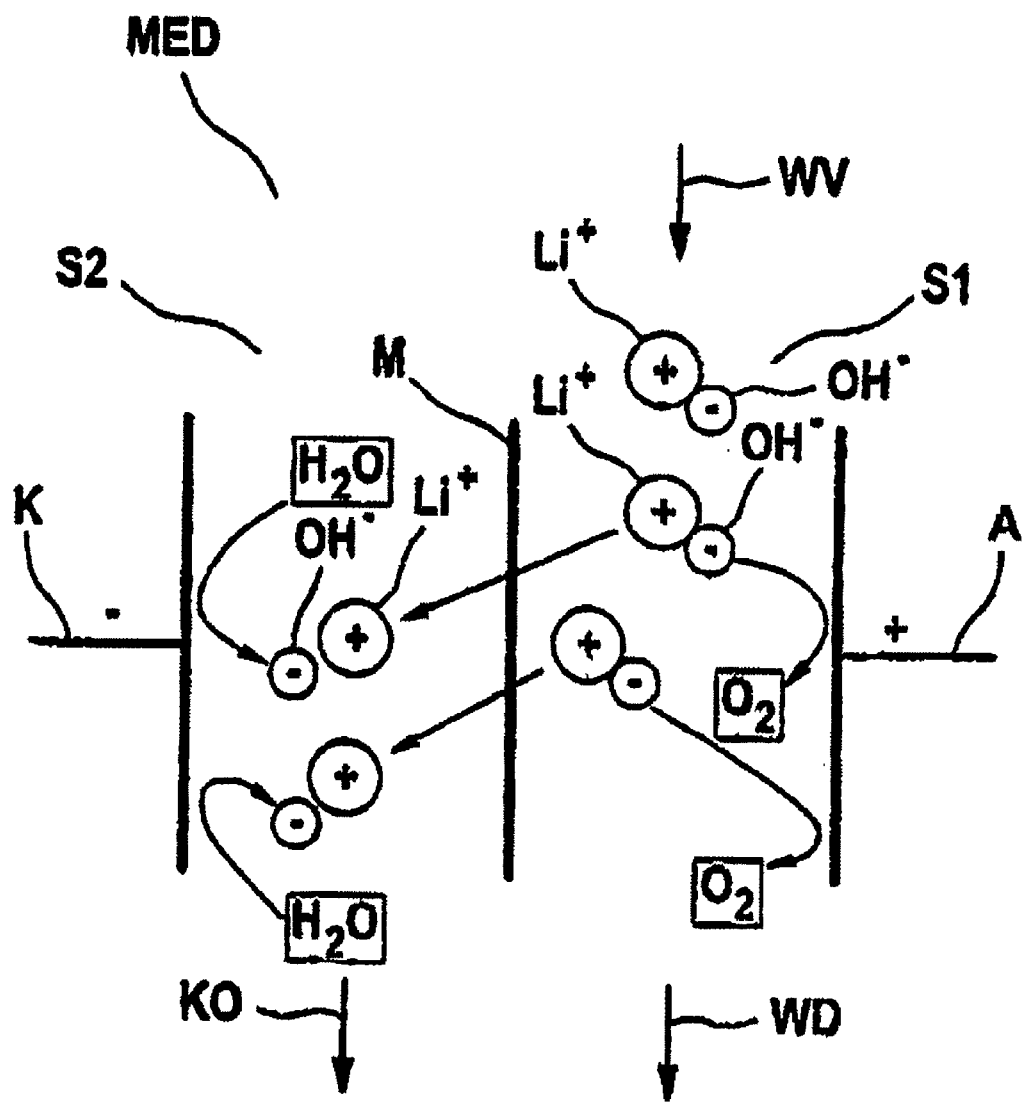
FIG. 1 is a diagrammatic illustration of an exchange of cations in an electrodialysis unit according to the invention.

Referring now to the figures of the drawings in detail and first, particularly to FIG. 1 thereof, there is shown an electrodialysis unit for carrying out the method according to the invention. The membrane configuration, illustrated as a semi-permeable membrane M, is advantageously formed as a stack of alternately electrodes and membranes of only one type (configured as cation exchanger membranes for the lithium extraction). The electrodes are fashioned alternately as cathode K and anode A. Either cooling water WV or a medium KO of a concentrate loop is guided in the interspaces between an electrode K, A and the membrane M. The configuration is illustrated schematically in FIG. 1 such that cooling water WV of a cooling-water loop is guided on the first side S1 of the electrodialysis unit MED. The water leaves the electrodialysis unit MED again as partially deionized cooling water WD (diluate). The medium KO (concentrate) is guided in a concentrate loop on the second side S2 of the electrodialysis unit. As shown in FIG. 1, lithium cations are exchanged between the cooling water WV and the concentrate KO in the presence of a voltage. In the case shown in FIG. 1, lithium cations are extracted from the cooling water and pass over into the concentrate. The cation exchanger membrane M performs the exchange. Oxygen $O_2$ is produced in the cooling water WV in the process. Insertion compensation is performed in the concentrate KO by the decomposition of water $H_2O$ into hydroxide ions $OH^-$.

The reactor coolant (for example, water WV, WD), serving to correct chemical conditioning of the lithium $^7Li^+$ that is to be withdrawn entirely or partially, also contains in addition to the deliberately added materials of boron and lithium $^7Li^+$ radioactive impurities that have been produced either by the nuclear fission or by activation as a consequence of the neutron emission. Through various, unavoidable mechanisms, this passes into the coolant by various, unavoidable mechanisms and cannot through the in the power plant be removed completely by the cleanup systems. Thus, activity concentrations of the nuclides $^{134}Cs$, $^{137}Cs$, $^{58}Co$, $^{60}Co$ that are of particular interest in this context and occur as cations are typically measured in the reactor coolant (water WV, WD) of modern pressurized water reactors. The order of magnitude is approximately between $10^6$ and $10^7$ Bq/Mg in such a case. During operation of a plant with a configuration of electrodes K, A and membranes M according to FIG. 1 with such a coolant, lithium can be lowered, for example, from an initial concentration of 1.4 ppm to a residual concentration of approximately 0.22 ppm, without a change occurring simultaneously in the boron concentration. A concentration of approximately 1250 ppm Li occurs in the concentrate KO in such a case.

For such a configuration, cationic radioactive impurities, in particular, the two cesium isotopes $^{134}Cs$ and $^{137}Cs$, also pass over up to over 90% into the concentrate KO, that is to say, into the concentrate loop. The activity also applies to the nuclide $^{60}Co$ to a certain extent.

Figure 2:
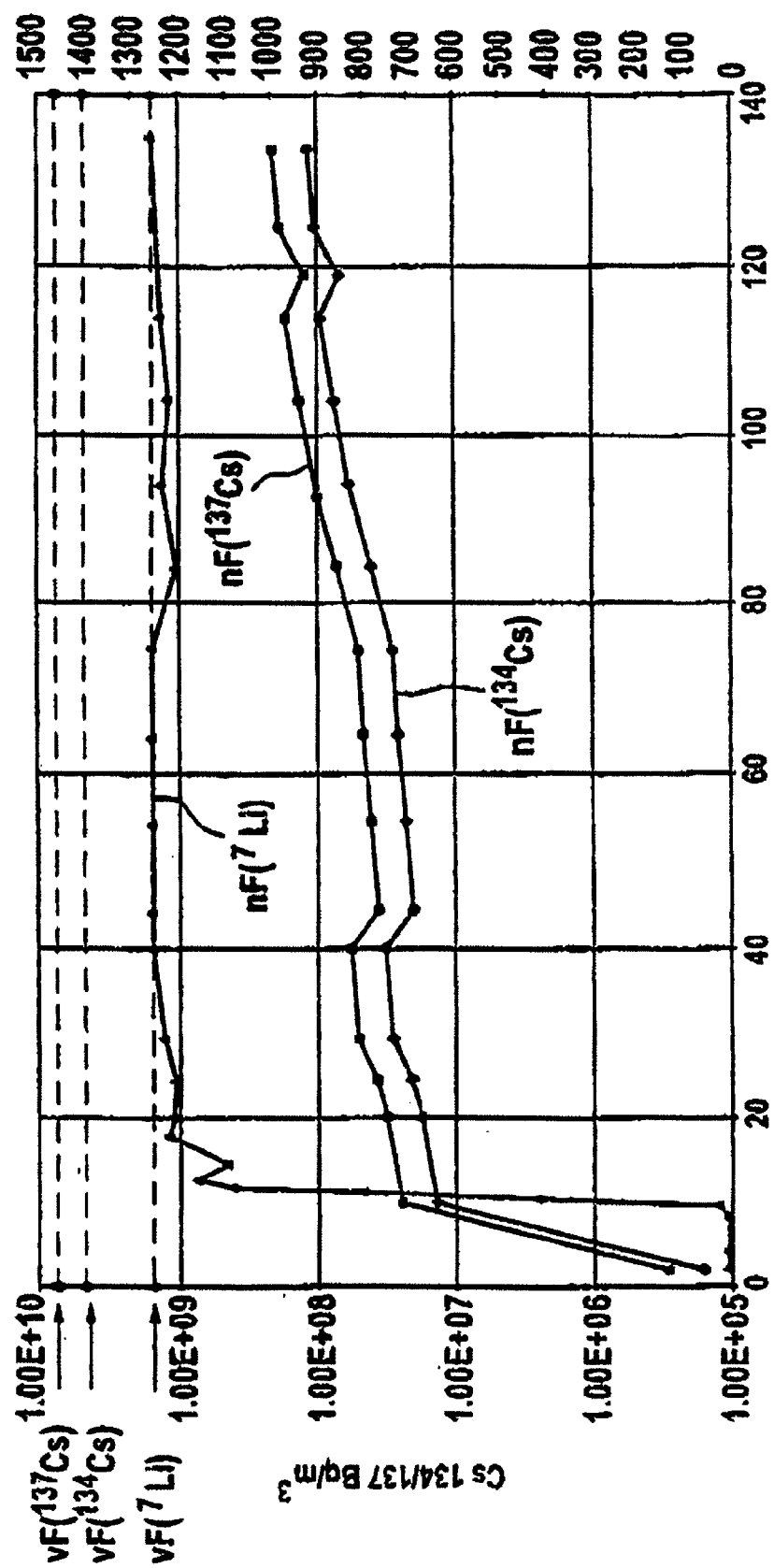
FIG. 2 is a graph indicating a measurement for filtering out cationic impurities in a selective ion exchanger disposed in a concentrate loop according to the invention.

According to the method, the concentrate is led through an ion exchanger, for example, with the aid of the exchanger. The ion exchanger is filled with cation exchanger resins that preferably have a particular selectivity for cesium. As may be gathered from FIG. 2, in the case of a cation exchanger used according to the method in an appropriate device, the storage capability for lithium is already exhausted after approximately 10 bed volumes have been led through, and no further lithium is absorbed from the concentrate KO. The result is to be gathered from FIG. 2, from the curve VF($^7$Li), which shows the lithium concentration upstream of the filter, by comparison with the curve NF($^7$Li), which shows the profile of the lithium concentration downstream of the filter. However, by contrast therewith, the storage capability for cesium is not yet exhausted even after approximately 140 bed volumes have been led through, and these resins still have a decontamination factor of approximately 40 for the cesium isotopes $^{134}Cs$ and $^{137}Cs$. The result is to be gathered, on one hand, from the comparison of the curves VF($^{134}Cs$) and NF($^{134}Cs$), as well as from the comparison of the curves VF($^{137}Cs$) and NF($^{137}Cs$) in FIG. 2.

Thus, a very effective separation of the cesium Cs and cobalt Co from the lithium Li is possible in the method. The separation is effected, in particular, by the high selectivity of the resins used, the high lithium and cesium concentrations, the high pH values, and the high conductivity of the medium KO (concentrate) in the concentrate loop. When normally introduced into a coolant loop with cooling water WV, WD, by contrast, such a resin finds that its storage capability for lithium is already exhausted after a few bed volumes, and also, however, has only a low decontamination factor left for the radionuclides.

However, in the case of the method and the device according to the invention, the lithium provided for reuse, therefore, remains in aqueous solution, while the cesium or other impurities are bound to the resin. The resin can be disposed of as waste in the usual way after its exhaustion.

For a 1.3 GW pressurized water reactor, the concentrate loop can advantageously have only a slight volume of the order of magnitude of approximately 1 $m^3$, and a low throughput of the order of magnitude of approximately 1.5 $m^3/h$. In the case of such a volume of concentrate KO, it is possible for virtually all the lithium that must be extracted from the coolant in the course of an operating cycle to be put into intermediate storage.

This has the advantage that the ion exchanger can be of appropriately small configuration for filtering out the cesium, cobalt, or other impurities. For example, a bed volume of approximately 80 l is sufficient. The activity retained in the resin can, therefore, be disposed of in a form that is very compact and easy to handle. If the same amount of activity were to be retained on the mixed bed filters that are present in the coolant cleanup systems of the plants that are normally used, the radioactive waste caused thereby would occupy a multiple by volume and give rise to correspondingly higher costs for disposal.

Figure 3:
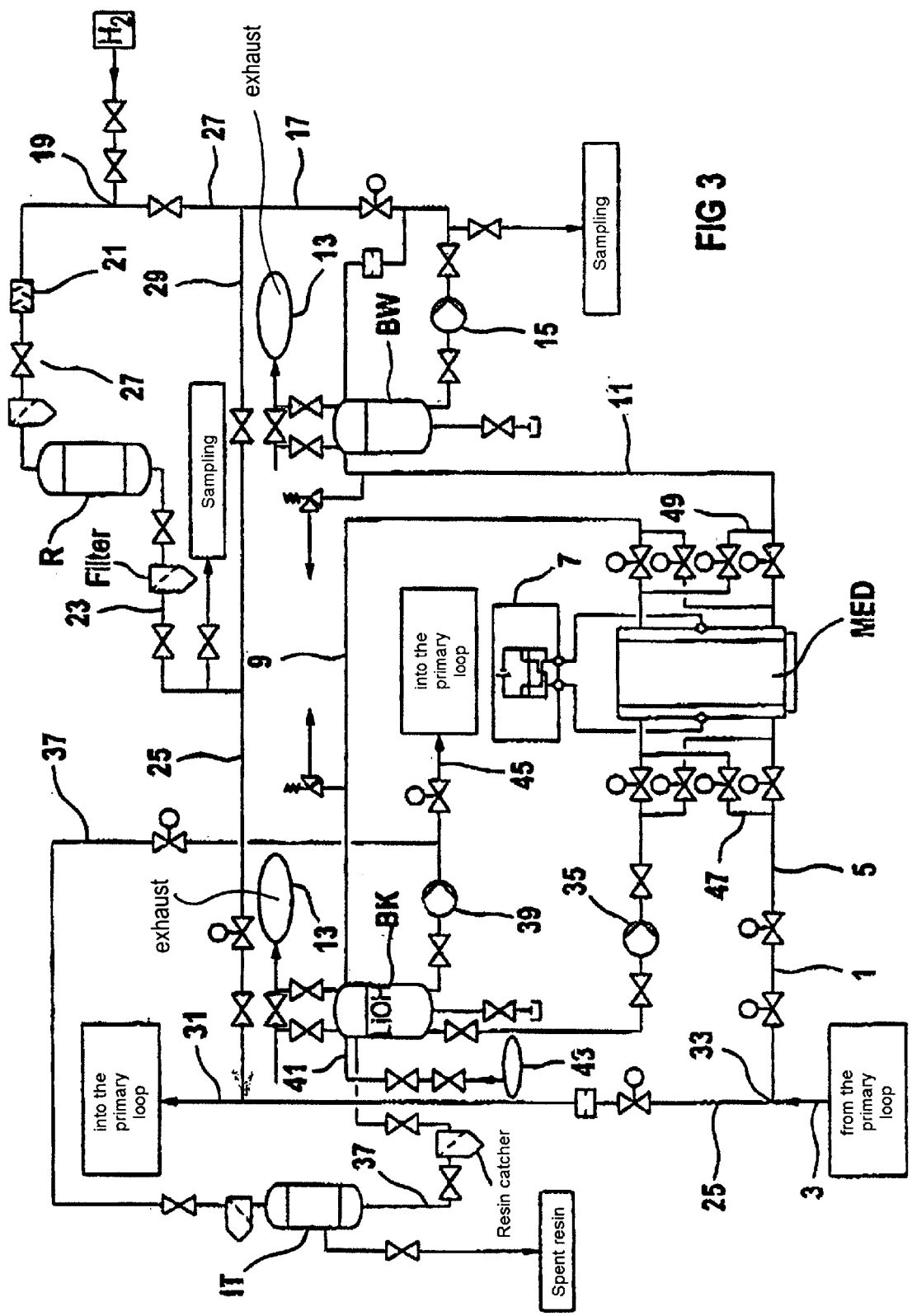
FIG. 3 is a schematic and block flow diagram of a device for carrying out the method according to the invention.

A device for carrying out the method is to be gathered from the circuit flow diagram of FIG. 3. Coolant WV originating from the primary loop 3 of a pressurized water reactor flows in a coolant line 1 with the concentration present there of boron B and lithium $^7Li^+$ and, therefore, an unavoidable concentration of contaminating radioactive materials (Cs, Co). The coolant WV is normally cooled to approximately 50° C., and has a low pressure required to overcome the flow resistances in the pipelines, fittings, and instruments. With the aid of a coolant feed line 5, the coolant WV (water) is fed entirely or partially to the electrodialysis unit, that is to say, a membrane electrodialysis unit MED. The electrodialysis unit MED is supplied with direct current through a power supply 7. It is possible to set the required voltage at the power supply 7. The cations, in particular, lithium and cesium, are withdrawn from the coolant WV in the membrane electrodialysis unit MED and are transferred into the concentrate KO. The concentrate KO is removed from the electrodialysis unit MED through the concentrate drain line 9. The coolant WD (diluate) strongly depleted of cations flows through the coolant drain line 11 into a coolant drains tank BW. The coolant drains tank BW is connected to an exhaust gas or exhaust air system 13 present in the power plant, such that the system 13 is unpressurized. The coolant WD is sucked from the coolant drains tank BW with the aid of a recirculation pump 15. Located on the pipeline 17 on the pressure side of the recirculation pump 15 is a connection 19 with the aid of which gaseous hydrogen $H_2$ can be added to the coolant WD.

The coolant WD is then first led through a static mixer 21, in which the added $H_2$ is brought completely into solution, and then through an $H_2O_2$ recombiner R. In the recombiner R, the oxygen $O_2$ entrained in the water by the membrane electrolysis process is completely removed by reaction with the hydrogen $H_2$. Likewise, the exhaust gas system 13 on the coolant drains tank BW also serves to vent the coolant loop, in particular, of $H_2O_2$ gas. Downstream of the catalyst R, the coolant WD is fed again through a coolant recirculation line 23 into the coolant line 25. The described paths 19, 21, and R can, however, also be connected directly to the coolant line 25 in accordance with a further configuration. In the configuration of the invention in FIG. 3, they are connected to a cooling-water line 27 that can also be bypassed by a bypass line 29. Both the coolant water line 27 and the bypass line 29 finally open again into the coolant line 25. The coolant can be fed from the coolant line 25 into the primary loop at a connection point 31, or, instead, be returned into the coolant feed line 1 at the point 33.

The medium KO of the concentrate loop is fed to the concentrate tank BK through the concentrate drain line 9. The tank BK contains the lithium hydroxide in aqueous solution. The concentrate holding tank BK is likewise connected to the exhaust gas or exhaust air system 13, that is to say, is likewise unpressurized. It is avoided thereby, in particular, that hydrogen produced in the concentrate KO (extraction of lithium from the cooling water) also mixes with oxygen also possibly produced (dosing of lithium to the cooling water) to form an explosive $H_2O_2$ gas. The concentrate KO can be sucked with the aid of a concentrate recirculating pump 35, and can be guided through the concentrate cells of the membrane electrodialysis apparatus MED. Finally, it is fed to the concentrate holding tank BK again through the concentrate drain line 9.

The concentrate can be sucked with a concentrate pump 39 in a second sectional loop 37, connected to the concentrate holding tank BK, and guided through the ion exchanger IT; the ion exchanger is configured, in particular, as a cation exchanger that contains cesium-selective cation exchanger resins. Finally, the concentrate is fed to the concentrate holding tank BK again through the further line of the sectional loop 37.

The connection 41 for deionized water 43 is also provided at the concentrate holding tank BK to supplement liquid extracted from the concentrate loop.

The concentrate can be fed into the primary loop, and the isotopically pure lithium can, thereby, he fed back into the primary loop, through a line 45, which is likewise connected to the concentrate holding tank BK.

The switching valve 47, 49 on the side of the concentrate loop (47) or on the side of the coolant loop (49) serves to change the respective medium in the sides of the membrane electrodialysis unit. In such a case, the polarity of the electrodes of the membrane electrodialysis unit is changed simultaneously such that the transport direction of the ions in the unit is also reversed. The process effects cleaning of the membrane M and the electrodes K, A of any possible deposits.

If, however, the change in the polarity of the electrode voltage is undertaken without switching over the switching valve, the membrane electrode dialysis unit MED doses cations from the concentrate KO into the coolant. This is possible in the method because the aqueous lithium solution in the concentrate loop can be cleaned of impurities in the ion exchanger IT using the method.

In the case of another use of the method, it is no longer necessary to undertake to remove oxygen from the draining coolant through a coolant sectional loop 27. A recombiner R can then be bypassed through a bypass line 29. In such a case, however, adequate purging of the tank atmosphere is ensured in the concentrate holding tank BK because oxygen is now added to the originally present hydrogen in the atmosphere. The purging ($H_2O_2$ gas venting) is performed through a feed/removal line into/out of the exhaust gas system 13.

Figure 4:
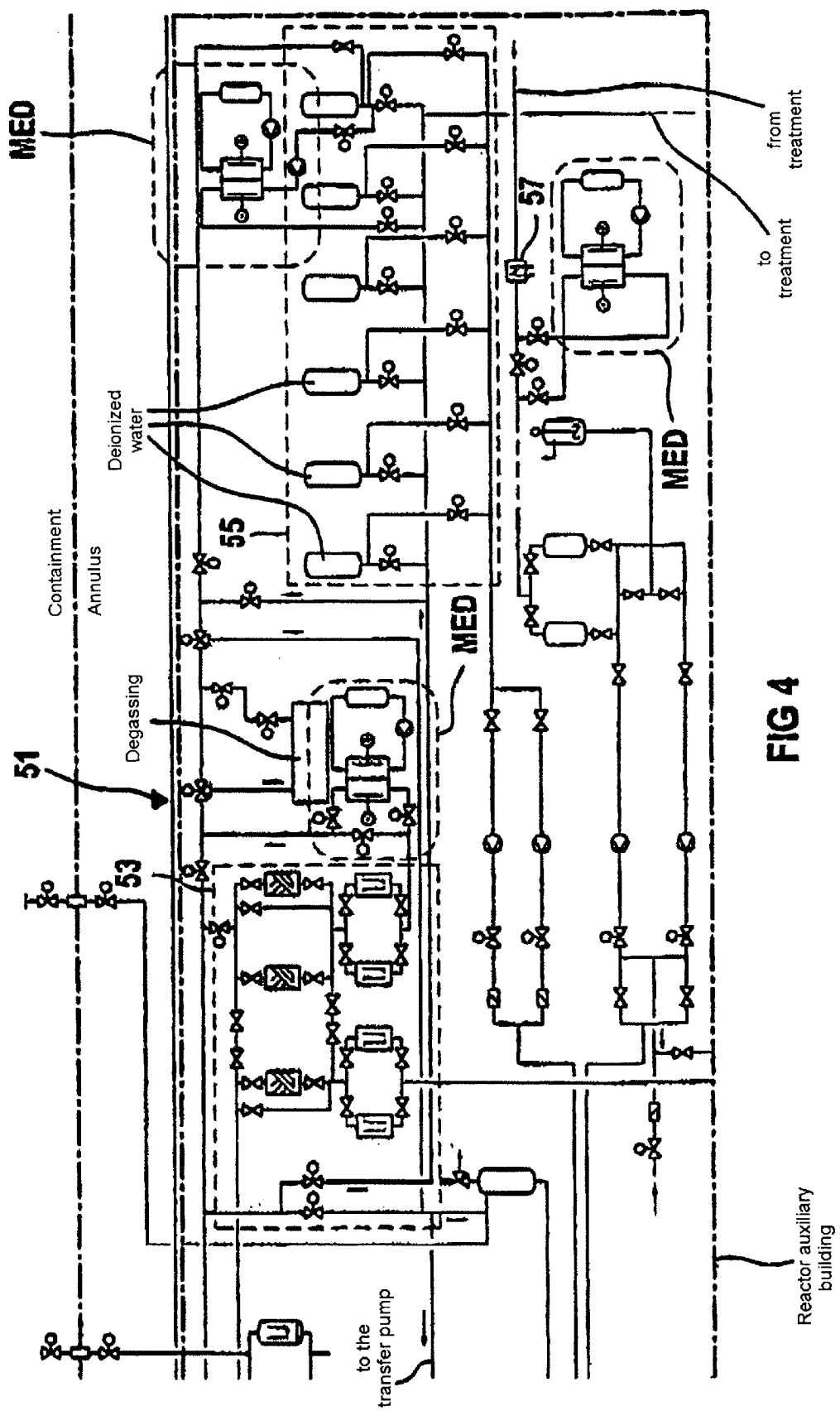
FIG. 4 is fragmentary, schematic and block flow diagram of an alternative configuration of the device according to the invention in a cooling-water system of a light water reactor.

As may be gathered from FIG. 4, in the cooling-water system 51 of a light water reactor, the membrane electrodialysis unit can be operated in one of the embodiments in an alternative fashion, for example, downstream of the coolant cleanup plant 53 of the cooling-water system 51. However, it can also be switched alternatively into the plant for storing primary coolant, that is to say, into the coolant storage device 55. Alternatively, however, the membrane electrodialysis unit MED can also be connected downstream of the evaporator plant for the purpose of concentrating boric acid and producing deionized water, that is to say, downstream of a coolant evaporator plant 57. However, it can also possibly be advantageous to combine the two alternatives with one another. The coolant cleanup plant 53, the coolant storage device 55, and the coolant evaporator plant 57 are indicated in FIG. 4 symbolically by an accumulation of components that are not named individually for the sake of clarity.

The connection of the membrane electrodialysis unit MED downstream of the coolant cleanup plant 53 can be performed such that a component stream of the coolant extracted by the volume control system is treated with the aid of membrane electrodialysis and, largely freed from lithium and the contaminating cations, fed directly into the primary loop again with the aid of the high-pressure transfer pump. In particular, the extraction of lithium and cesium exerts no influence on the configuration concentration in the primary loop. There is also no need to exchange coolant with the aid of a coolant storage device and the system for feeding in boron/deionized water. In particular, there is no need to feed $H_2$ to remove oxygen because the hydrogen concentration present in the extracted coolant is sufficient. If coolant is exchanged at a higher rate than corresponds to the capacity of the membrane electrodialysis unit, the coolant can no longer be treated.

Therefore, it is advantageous, if appropriate, to switch the membrane electrodialysis unit MED into a coolant storage device 55. In such a case, exchanging coolant lowers the lithium concentration. Coolant from the primary loop, which contains boron and lithium, is extracted with the aid of the volume control system and replaced by coolant from the coolant storage device 55 with the same boron concentration but without lithium. The process has the advantage that, as concerns time and system, the method proceeds in the membrane electrodialysis unit completely independently of the extraction and reintroduction of coolant with the aid of the volume control system. It is also possible to use the method to treat the coolant that was extracted from the primary loop at a higher rate of flow. It is necessary to supply hydrogen from outside for the purpose of removing oxygen from the treated coolant (water) according to the method because degassing of hydrogen can occur only due to the intermediate storage.

If the membrane electrodialysis unit MED is connected downstream of a coolant evaporator plant 57, the configuration has the advantage that the system for carrying out the method can be given particularly small dimensions because the flow of concentrate KO is particularly small by comparison with the coolant mass flow RV, WW. The lithium concentration is lowered by a coolant exchange: coolant from the primary loop, which contains boron and lithium, is extracted with the aid of the volume control system and replaced with coolant from the coolant storage device with the same boron concentration but without lithium. The method, once again, proceeds in terms of time and system independently of the extraction and reintroduction of coolant. In particular, it is thereby also possible to treat the coolant that was extracted from the primary loop at a higher rate of flow. However, it is necessary to remove oxygen here, as well. Moreover, the boric acid concentrate must be cooled before treatment in the membrane electrodialysis unit.

We claim:

1. A method for reducing cationic impurities in a cooling water, which comprises:
   providing a light water reactor having:
      a cooling-water loop containing a cationic solution;
      a concentrate loop containing a medium in which a heightened cation concentration is produced; and
      a selective ion exchanger disposed in the concentrate loop;
   guiding cooling water of the cooling-water loop through a first side of an electrodialysis unit;
   guiding the medium of the concentrate loop through a second side of the electrodialysis unit; and
   filtering out cationic impurities from the medium in the selective ion exchanger.

2. The method according to claim 1, which further comprises storing the medium and feeding the medium into the cooling-water loop when desired.

3. The method according to claim 1, which further comprises separating the cooling water on the first side of the electrodialysis unit and the medium on the second side of the electrodialysis unit with a membrane configuration substantially only exchanging cations.

4. The method according to claim 1, which further comprises substantially suppressing transport of anions from the cooling water into the medium.

5. The method according to claim 1, which further comprises substantially suppressing transport of boron-containing anions from the cooling water into the medium.

6. The method according to claim 1, which further comprises guiding the medium, with the selective ion exchanger, in the concentrate loop through a partial loop having an accumulator for concentrating the cations and through a further partial loop connected to the accumulator to filter out the cationic impurities.

7. The method according claim 1, which further comprises selectively guiding:
   the cooling water of the cooling-water loop through the first side of the electrodialysis unit and the medium of the concentrate loop through the second side of the electrodialysis unit; and
   the cooling water through the second side of the electrodialysis unit and the medium through the first side.

8. The method according to claim 1, which further comprises extracting cooling water from the cooling-water loop and storing the extracted cooling water.

9. The method according to claim 1, which further comprises venting at least one of the concentrate loop and the cooling-water loop.

10. The method according to claim 1, which further comprises withdrawing $H_2O_2$ gas mixtures from at least one of the concentrate loop and the cooling-water loop.

11. The method according to claim 1, which further comprises guiding the cooling-water loop through an $H_2O_2$ recombiner.

12. The method according to claim 1, which further comprises transporting cations from the cooling-water loop into the concentrate loop through a cation exchanger membrane.

13. The method according to claim 12, which further comprises:
feeding at least a portion of the cooling water to a cooling-water sectional line;
admixing the portion with $H_2$; and
guiding at least the portion through an $H_2O_2$ recombiner.

14. The method according to claim 13, which further comprises:
transferring cations from the concentrate loop into the cooling-water loop through a cation exchanger membrane; and
feeding the cooling water to a bypass line that bypasses the $H_2O_2$ recombiner.

15. The method according to claim 1, which further comprises transferring lithium cations from the concentrate loop into the cooling-water loop through a cation exchanger membrane.

16. The method according to claim 1, which further comprises transferring cations from the concentrate loop into the cooling-water loop through a cation exchanger membrane.

17. A method for dosing lithium in cooling water, which comprises:
providing a light water reactor having:
a cooling-water loop containing a cooling water with cationic impurities;
a concentrate loop containing a medium having a heightened cation concentration; and
a selective ion exchanger disposed in the concentrate loop;
guiding the cooling water of the cooling-water loop through a first side of an electrodialysis unit;
guiding the medium of the concentrate loop through a second side of the electrodialysis unit;
applying an electric voltage in the electrodialysis unit to control an exchange of lithium cations between the cooling water in the cooling-water loop and the medium in the concentrate loop; and
filtering out cationic impurities from the medium in the selective ion exchanger.

18. The method according to claim 17, which further comprises storing the medium and feeding the medium into the cooling-water loop when desired.

19. The method according to claim 17, which further comprises separating the cooling water on the first side of the electrodialysis unit and the medium on the second side of the electrodialysis unit with a membrane configuration substantially only exchanging cations.

20. The method according to claim 17, which further comprises substantially suppressing transport of anions from the cooling water into the medium.

21. The method according to claim 17, which further comprises substantially suppressing transport of boron-containing anions from the cooling water into the medium.

22. The method according to claim 17, which further comprises guiding the medium, with the selective ion exchanger, in the concentrate loop through a partial loop having an accumulator for concentrating the cations and through a further partial loop connected to the accumulator to filter out the cationic impurities.

23. The method according claim 17, which further comprises selectively guiding:
the cooling water of the cooling-water loop through the first side of the electrodialysis unit and the medium of the concentrate loop through the second side of the electrodialysis unit; and
the cooling water through the second side of the electrodialysis unit and the medium through the first side.

24. The method according to claim 17, which further comprises extracting cooling water from the cooling-water loop and storing the extracted cooling water.

25. The method according to claim 17, which further comprises venting at least one of the concentrate loop and the cooling-water loop.

26. The method according to claim 17, which further comprises withdrawing $H_2O_2$ gas mixtures from at least one of the concentrate loop and the cooling-water loop.

27. The method according to claim 17, which further comprises guiding the cooling-water loop through an $H_2O_2$ recombiner.

28. The method according to claim 17, which further comprises transporting cations from the cooling-water loop into the concentrate loop through a cation exchanger membrane.

29. The method according to claim 28, which further comprises:
feeding at least a portion of the cooling water to a cooling-water sectional line;
admixing the portion with $H_2$; and
guiding at least the portion through an $H_2O_2$ recombiner.

30. The method according to claim 29, which further comprises:
transferring cations from the concentrate loop into the cooling-water loop through a cation exchanger membrane; and
feeding the cooling water to a bypass line that bypasses the $H_2O_2$ recombiner.

31. The method according to claim 17, which further comprises transferring lithium cations from the concentrate loop into the cooling-water loop through a cation exchanger membrane.

32. The method according to claim 17, which further comprises transferring cations from the concentrate loop into the cooling-water loop through a cation exchanger membrane.

33. A method for dosing lithium in cooling water, which comprises:
reducing cationic impurities in cooling water by:
providing a light water reactor having:
a cooling-water loop containing a cooling water with cationic impurities;
a concentrate loop containing a medium having a heightened cation concentration; and
a selective ion exchanger disposed in the concentrate loop;
guiding the cooling water of the cooling-water loop through a first side of an electrodialysis unit;
guiding the medium of the concentrate loop through a second side of the electrodialysis unit;
applying an electric voltage in the electrodialysis unit to control an exchange of lithium cations between the cooling water in the cooling-water loop and the medium in the concentrate loop; and
filtering out cationic impurities from the medium in the selective ion exchanger.

34. A method for reducing cationic impurities in a cooling water, which comprises:
  dosing lithium in cooling water by:
    providing a light water reactor having:
      a cooling-water loop containing a cationic solution;
      a concentrate loop containing a medium in which a heightened cation concentration is produced; and
      a selective ion exchanger disposed in the concentrate loop;
    guiding cooling water of the cooling-water loop through a first side of an electrodialysis unit;
    guiding the medium of the concentrate loop through a second side of the electrodialysis unit; and
    filtering out cationic impurities from the medium in the selective ion exchanger.

35. In a light water reactor having a cooling-water loop containing a cooling water with cationic impurities and a concentrate loop containing a medium having a heightened cation concentration, a device for at least one of reducing cationic impurities and dosing lithium in the cooling water, the device comprising:
  an electrodialysis unit having two sides, one of said sides connected to the cooling-water loop and another of said sides connected to the concentrate loop; and
  a selective ion exchanger disposed in the concentrate loop for at least one of reducing cationic impurities and dosing lithium in the cooling water.

36. The device according to claim 35, wherein said electrodialysis unit has a device controlling an exchange of lithium cations between the cooling water in the cooling-water loop and the medium in the concentrate loop by applying an electric voltage.

37. The device according to claim 35, wherein said two sides are separated by a membrane configuration having at least one cation exchanger membrane exchanging substantially only cations.

38. The device according to claim 37, wherein said he membrane configuration is substantially permeable to Li cations.

39. The device according to claim 35, wherein said ion exchanger is selective for at least one of the group consisting of cationic Cs nuclides and cationic Co nuclides.

40. The device according to claim 35, wherein said ion exchanger is a cation exchanger.

41. The device according to claim 40, wherein said cation exchanger contains resins selected from the group consisting of phenol-based resins and formaldehyde-based resins.

42. The device according to claim 40, wherein said cation exchanger contains resins selected from the group consisting of Duolite and Amberlite.

43. The device according to claim 35, including an $H_2O_2$ recombiner connected to the cooling-water loop.

44. The device according to claim 43, wherein said $H_2O_2$ recombiner includes a catalyst bed filled with an anion exchanger.

45. The device according to claim 44, wherein said anion exchanger is a palladium-doped resin.

46. The device according to claim 44, wherein said anion exchanger is Lewatit.

47. The device according to claim 35, including a switching valve connecting said electrodialysis unit to the cooling-water loop and to the concentrate loop, said switching valve selectively connecting the water loop to one of said sides of said electrodialysis unit and the concentrate loop to another of said sides of said electrodialysis unit and vice-versa.

48. The device according to claim 35, including an accumulator having a sealable feed-in opening into the cooling-water loop, said accumulator connected to the concentrate loop.

49. A light water reactor, comprising:
  a cooling-water loop containing a cooling water with cationic impurities;
  a concentrate loop containing a medium having a heightened cation concentration;
  an electrodialysis unit having two sides, one of said sides connected to said cooling-water loop and another of said sides connected to said concentrate loop; and
  a selective ion exchanger disposed in said concentrate loop for at least one of reducing cationic impurities and dosing lithium in said cooling water.

50. A cooling-water system of a light water reactor, comprising:
  at least one of:
    a cooling-water cleanup plant;
    a cooling-water storage device; and
    a cooling-water evaporator plant;
  a device for at least one of reducing cationic impurities and dosing lithium in cooling water, said device having:
    a cooling-water loop containing the cooling water with cationic impurities, said cooling-water loop connected to at least one of said cooling-water cleanup plant, said cooling-water storage device, and said cooling-water evaporator plant;
    a concentrate loop containing a medium having a heightened cation concentration;
    an electrodialysis unit having two sides, one of said sides connected to said cooling-water loop and another of said sides connected to said concentrate loop; and
    a selective ion exchanger disposed in said concentrate loop.

* * * * *